INVENTOR
HUGH A. MITCHELL
ATTORNEYS

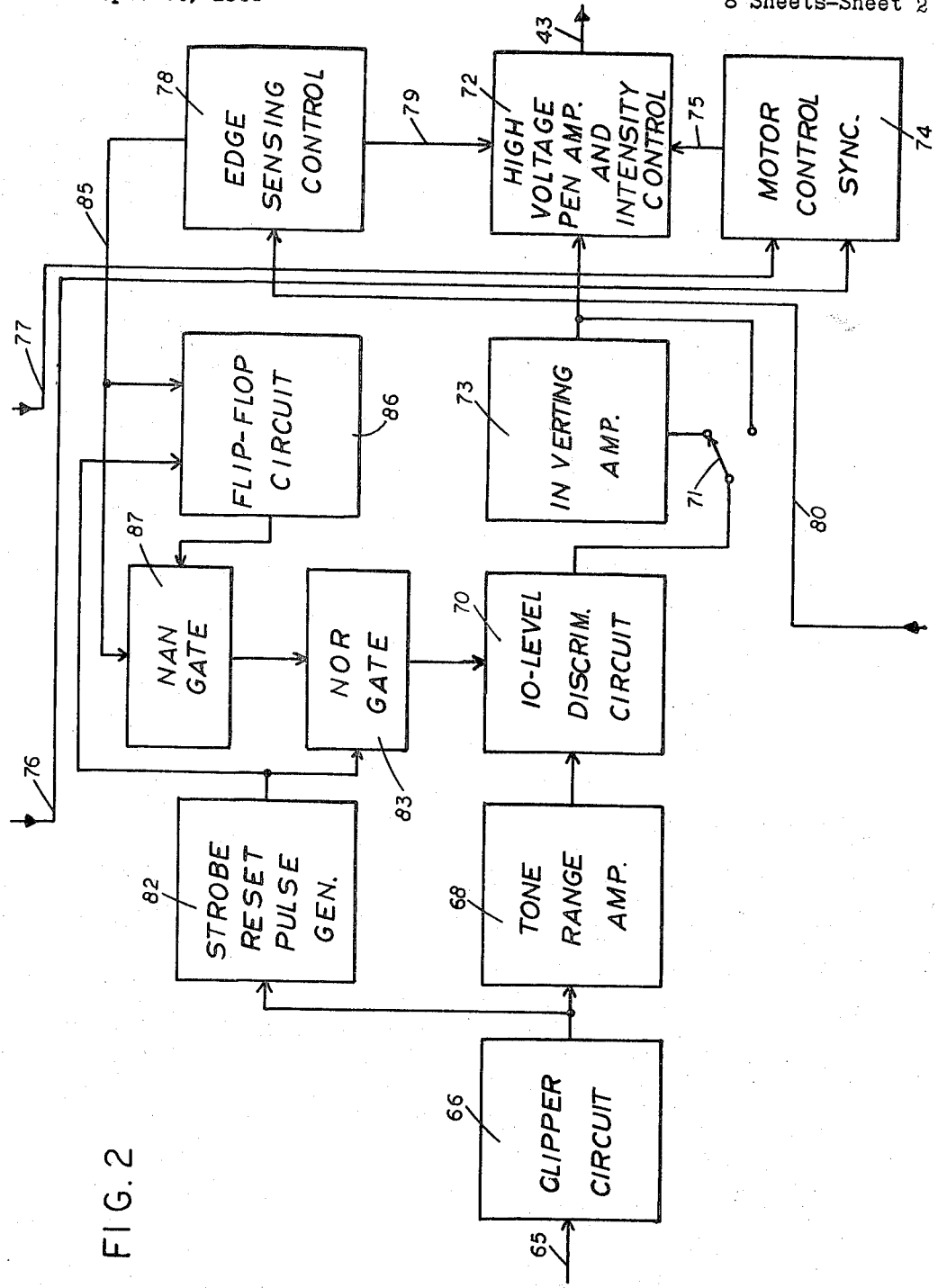

INVENTOR
HUGH A. MITCHELL
ATTORNEYS

Dec. 22, 1970  H. A. MITCHELL  3,548,641
RECORDING SYSTEM FOR ULTRASONIC INSPECTION APPARATUS
Filed Sept. 30, 1966  8 Sheets-Sheet 4

INVENTOR
HUGH A. MITCHELL
BY
ATTORNEYS

INVENTOR
HUGH A. MITCHELL

ATTORNEYS

INVENTOR
HUGH A. MITCHELL

ATTORNEYS

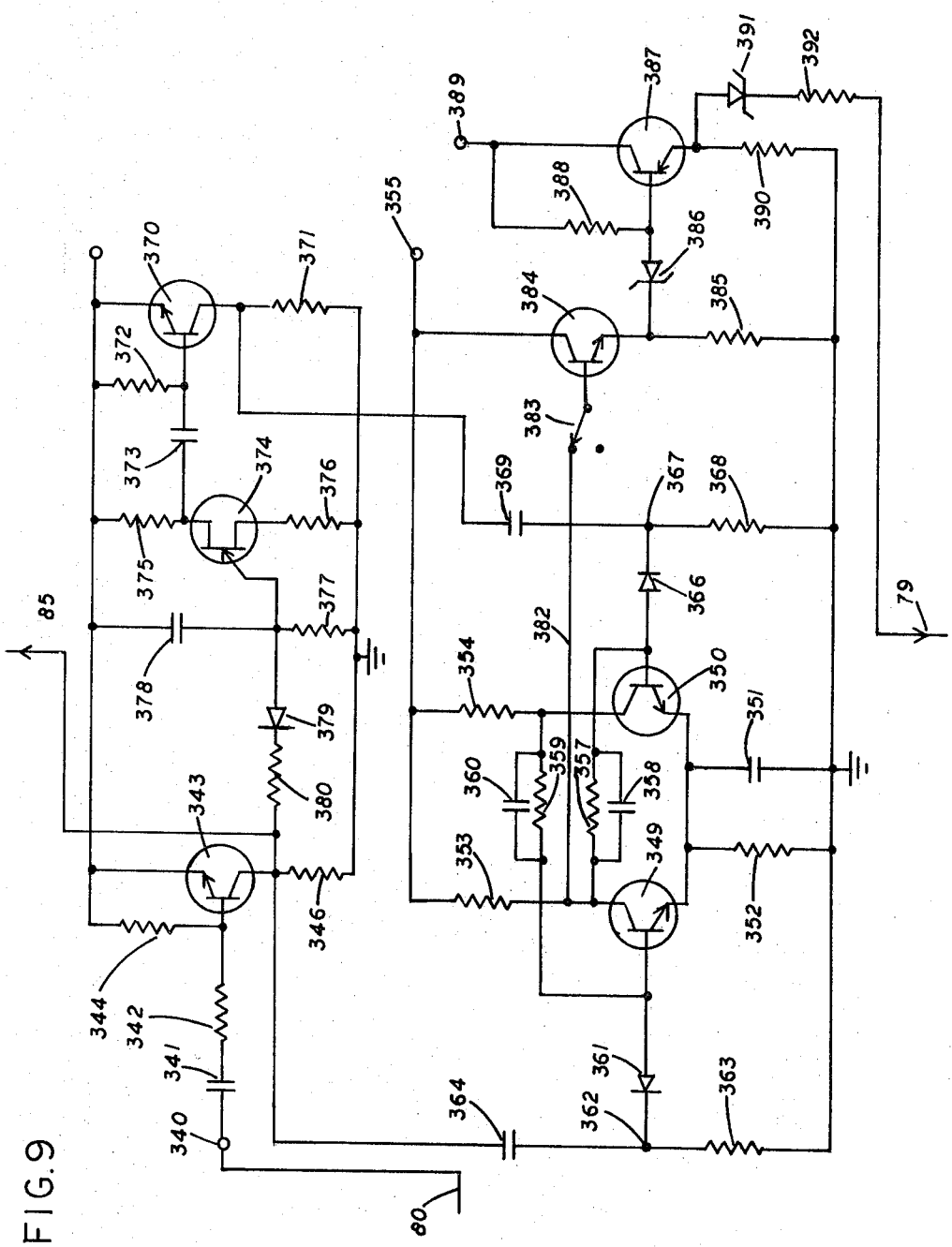

United States Patent Office 3,548,641
Patented Dec. 22, 1970

3,548,641
RECORDING SYSTEM FOR ULTRASONIC INSPECTION APPARATUS
Hugh A. Mitchell, North Hollywood, Calif., assignor to Magnaflux Corporation, Chicago, Ill., a corporation of Delaware
Filed Sept. 30, 1966, Ser. No. 583,255
Int. Cl. G01n 29/04
U.S. Cl. 73—67.9
20 Claims

ABSTRACT OF THE DISCLOSURE

Recording system for an ultrasonic pulse-echo C-scan system in which a recording is produced at a point moved over a recording medium in synchronism with scanning of a part. Gated signals are applied to a multi-level discriminator circuit to produce and hold an output signal at one of a number of discrete output levels, the output signal being applied to the recording means. Important features relate to the discriminator circuit which includes a plurality of bistable circuits, to clipper means for removing lower amplitude portions of the gated signal, to the resetting of the discriminator circuit and to edge sensing and indicating means.

---

This invention relates to a recording system for ultrasonic inspection apparatus and more particularly to a system which is highly reliable in operation and which produces recordings of the internal structure of parts which are very clear and accurate and readily interpreted.

The recording system of this invention has other applications, but was particularly designed for and is especially advantageous when combined with an ultrasonic pulse-echo C-scan system wherein a probe unit including an ultrasonic transducer is pulsed to transmit bursts of ultrasonic energy toward a part and to receive echoes from the front and back surfaces of the part and from inhomogeneities therein. The probe unit is moved over the part in a scanning pattern in a plane transverse to the direction of transmission and reception of the ultrasonic energy, and a recording is made at a point on a recording medium which is moved over the medium in synchronism with and in a pattern corresponding to the scanning movement of the probe. To restrict the recorded signals to those produced by echoes from inhomogeneities within the part, the sonic signal from the transducer is gated by applying it through a gate which is enabled for a time interval beginning at a time after reception of the front surface echo and ending before reception of the back surface echo. Thus a gated sonic signal is produced having pulses therein, with the amplitudes of the pulses being proportional to the magnitudes of the flaws or defects within the part.

In such ultrasonic C-scan systems as well as in other types of systems, the pulses to be recorded have very short durations and pulse-stretching means have been proposed in the prior art which respond to each pulse to charge a capacitor to maintain for a substantial time interval a voltage at a level corresponding to the amplitude of the pulse. In such prior art systems, the capacitor may be discharged by means of the timing pulse which is used also for controlling pulsing of the transducer. With such pulse-stretching circuits, a substantial improvement in operation can be obtained, but the circuits have had limitations with respect to accuracy and reliability of operation, and problems have been encountered in the effective discharging of the pulse-stretching circuit.

This invention was evolved with the general object of overcoming the disadvantages of prior circuits and of providing a recording system which is highly reliable in operation and which produces clear, accurate and readily interpreted indications of the internal structure of a part.

According to an important feature of the invention, a circuit is provided which does not involve a pulse-stretching operation but which produces the same advantages of the prior art circuits with additional advantages in regard to accuracy and clarity of the indications and in regard to reliability. In particular, a multi-level discriminator circuit is provided which digitizes a gated sonic pulse into a plurality of discrete output levels. In the illustrated system, ten progressively different output levels may be obtained, respectively corresponding to contiguous amplitude ranges of the peaks of the sonic pulses. When the output signal is applied to the recording system, progressively different shading levels are produced, respectively corresponding to the progressively different discrete output levels.

In accordance with a specific feature of the invention, the circuit is arranged to produce and hold the output signal at any one of the discrete output levels for a substantial length of time relative to the time interval between the start of each gating time interval and the start of the succeeding gating time interval. Thus an output signal is obtained for a substantial time interval, without involving the use of pulse-stretching circuitry.

In accordance with a further specific feature of the invention, reset means are provided for resetting the multilevel discriminator circuit prior to application of the peak of a gated sonic pulse thereto. Preferably, a reset pulse is generated in response to the initial portion of a gated sonic pulse, with the reset pulse being applied to restore the discriminator circuit to an initial condition, prior to application of the peak of the sonic pulse thereto.

According to a further important feature of the invention, the discriminator circuit comprises a plurality of flip-flop circuits each having first and second inputs and arranged to be triggered to one condition when the amplitude of the signal applied to the first input exceeds a certain value in relation to a signal applied to the second input, with the sonic pulses being applied to all of the first inputs and with biasing means being provided for applying progressively different voltages to the second inputs of the flip-flop circuits. With this arrangement, the applied sonic pulses perform triggering operations which can be effected with a high degree of accuracy and reliability.

In accordance with a further feature of the invention, the discriminator circuit is connected to a summing circuit which preferably comprises a plurality of switch devices formed as part of the flip-flop circuits, the switch devices being arranged to be rendered conductive when the peak amplitudes of the gated sonic pulses exceed the progressively different levels, with a plurality of relatively high impedances being connected in series with the switch devices to form series circuits all connected to one terminal of a voltage source, and with a common output impedance connected between the other ends of the series circuits and an opposite terminal of the voltage source.

Another specifiic feature of the invention relates to the automatic reset of the discriminator circuit when no sonic pulse is applied to the discriminator circuit during any gating time interval of the gated sonic signal.

A further important feature of the invention relates to the provision of means responsive to the absence of an echo signal produced from the front surface of the part for effecting the recording of indications on the recording medium. With this feature, a very clear outline of the edge of the part can be obtained during the scanning operation, to produce a recording in which interpretation is greatly facilitated. Thus the location of defects in relation to the boundaries of the part can be readily determined.

Another important feature of the invention relates to the provision of control means for preventing recording of indications on the medium at times when the probe means is stationary relative to the part. This feature is particularly advantageous when the recording means is of a type including a pen movable over a paper recording medium with means for applying a relatively high voltage to the pen, in that the control means prevents application of the high voltage to the pen while it is stationary relative to the medium, so as to prevent burning of the paper.

Additional features of the invention relate to the clipping of sonic pulses prior to application to the discriminator circuit, to the provision of tone range adjustment means to properly correlate the shading levels to the magnitudes of the defects, and to circuits used in the discriminator circuit, the reset circuits, the edge-sensing circuits and other circuits, to obtain accurate and reliable operation.

This invention contemplates other objects, features and advantages which will become more fully apparent from the following detailed description taken in conjunction with the accompanying drawings which illustrate a preferred embodiment and in which:

FIG. 2 is a schematic block diagram of a recording circuit of the system of FIG. 1;

FIG. 9 is a circuit diagram of an edge-sensing circuit.

Figure 1:
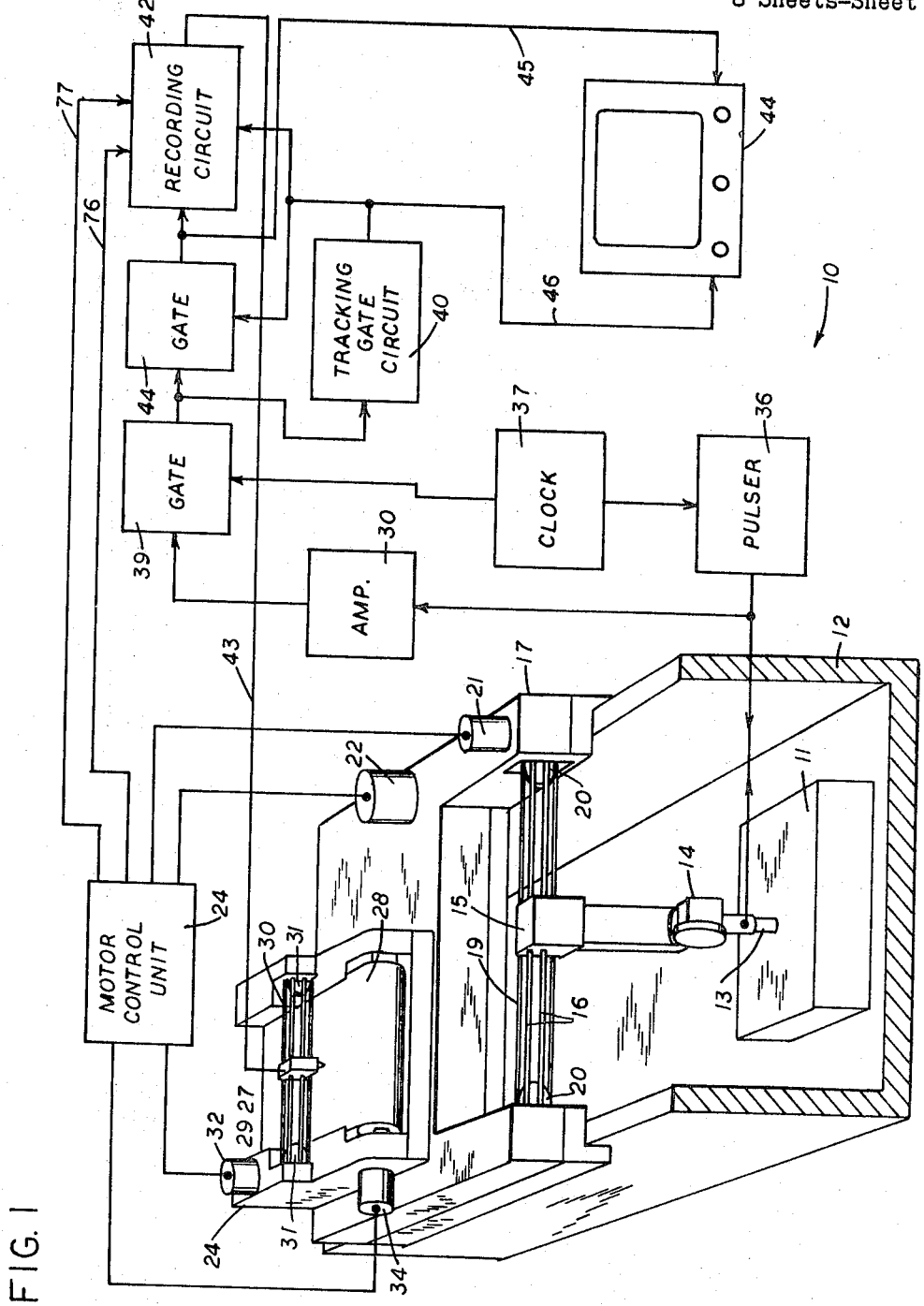
FIG. 1 is a diagrammatic view illustrating a recording system constructed according to the invention, used in conjunction with an ultrasonic pulse-echo C-scan part inspection system.

Referring to FIG. 1, reference numeral 10 generally designates a part inspection system which incorporates a recording system constructed in accordance with the principles of the invention.

As diagrammatically illustrated, a part 11 to be inspected is immersed in a tank 12, partially filled with water or any other liquid suitable as an ultrasonic wave coupling medium. A probe 13 is provided including a transducer operative to transmit pulses of ultrasonic energy through the liquid and into the part 11, and to receive echoes from the front and back (or top and bottom) surfaces of the part 11 and from inhomogeneities therein. The probe 13 is supported through a suitable manipulator mechanism 14 from a support 15 which is supported for reciprocable movement on a pair of horizontal rods 16 the ends of which are supported by a carriage 17. The carriage 17 is supported on the upper edges of side walls of the tank 12 for horizontal movement in a direction transverse to the horizontal movement of the support 15 on the rods 16, suitable rollers being preferably provided for supporting the carriage 17 on the side walls of the tank 12.

To control the movement of the support 15 on the rods 16, a belt 19 connected to the support 15 is entrained about pulleys 20 one of which is driven by a drive unit 21 which preferably comprises a reversible DC motor. A similar drive unit 22 is provided for moving the carriage 17 along the tank 12. The drive units 21 and 22 are connected to a motor control unit 24. In normal operation, the unit 21 operates to move the support 15 in one direction until a certain limit is reached, when the movement of the support 15 is stopped, and the drive unit 22 then operates to move the carriage 17 a certain distance along the tank 12. The unit 21 then operates to move the support 15 in the opposite direction until an opposite travel limit is reached, whereupon the movement of the support 15 is again stopped, and the unit 22 is again operated to index the carriage a certain distance along the tank 12. The unit 21 again operates to move the support 15 in the first-described direction. This operation is repeated to scan the entire part 11, or a certain portion thereof.

A pen recorder 26 is supported on the carriage 17 and includes a pen unit 27 movable over a recording paper 28 in synchronism with and in a pattern corresponding to the movement of the probe 13 over the part 11. The pen unit 27 may be supported for movement on horizontal support bars 29 and may be connected to a belt 30 entrained on pulleys 31, one of which is driven by a drive unit 32. A take-up roll 33 for the paper 28 is driven by a drive unit 34. Drive units 32 and 34 are connected to the motor control unit 24, to be operated in the same manner that the control units 21 and 22 are operated. Since this type of scanning and recording system is old in the art, the details of the mechanical construction and the electrical circuitry are not illustrated.

The ultrasonic transducer of the probe 13 is connected to a pulser 36 which is controlled from an electronic clock circuit 37 to periodically energize the transducer at a relatively high repetition rate, and to cause transmission of bursts of ultrasonic energy through the water and into the part 11. The transducer of the probe 13 is also connected to the input of an amplifier 38 the output of which is applied through a gate 39 which is controlled from the clock 37 to be opened after a short delay following the pulsing of the transducer. The output of the gate 39 is applied to a tracking gate circuit 40 which operates in response to the first echo pulse received, i.e., the pulse from the front or top surface of the part 11, to generate a gate signal for a certain time interval. The tracking gate signal is applied to a gate 41 to apply the output of the gate 39 to a recording circuit 42. The recording circuit 42 develops an output signal which is applied through a line 43 to the recording pen unit 27.

Although not required in the system, a monitoring oscilloscope 44 may be provided having a vertical deflection input connected through a line 45 to the output of the gate 41, and having a sweep circuit control input connected through a line 46 to the output of the tracking gate circuit 40. The oscilloscope 44 thus permits visual operation of "pips" generated from echoes from inhomogeneities within the part 11.

Figure 3:
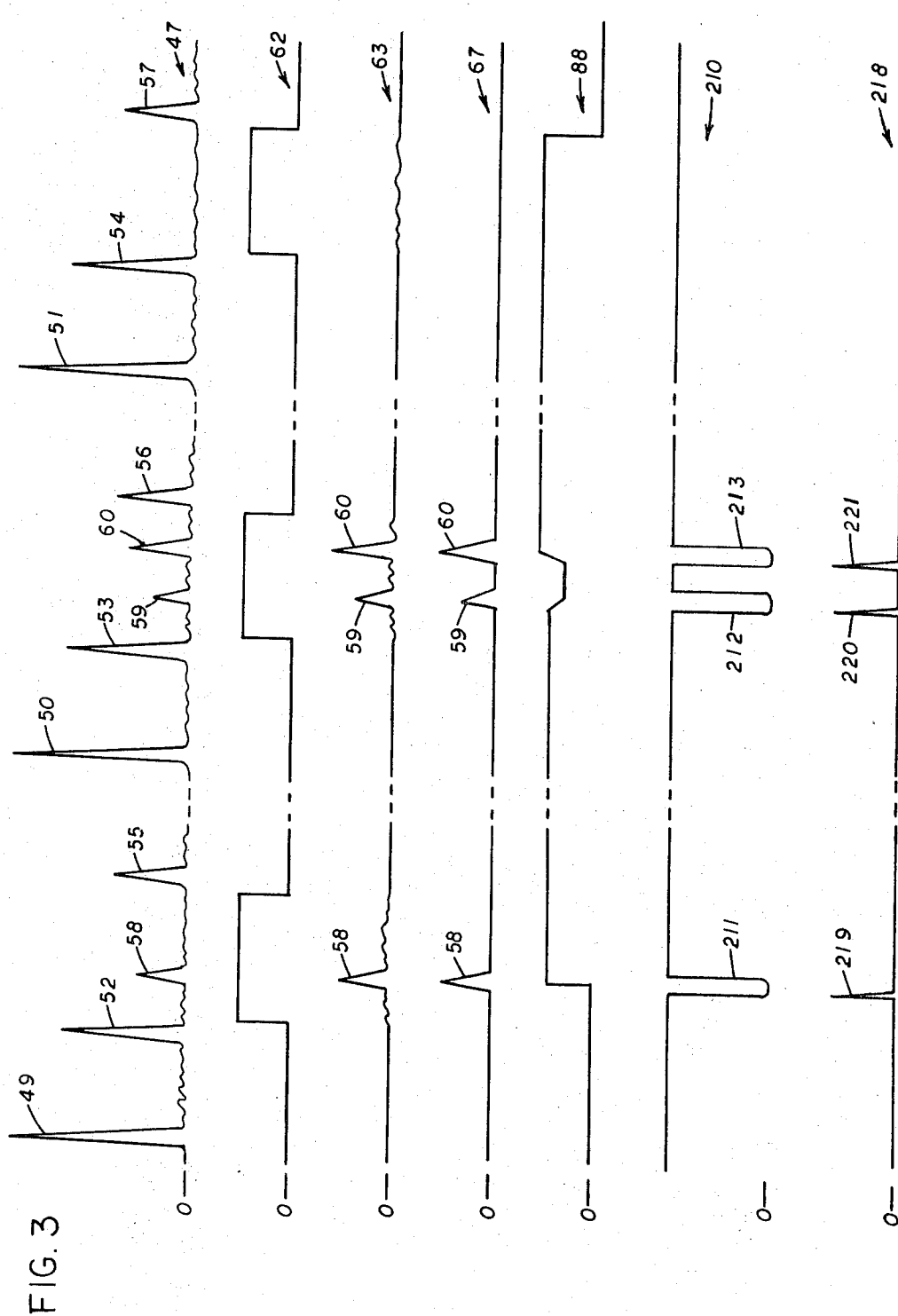
FIG. 3 is a waveform diagram for explanation of the operation of the recording circuit.

FIG. 3 shows the waveforms produced at various points of the system. Reference numeral 47 indicates the type of waveform which may be produced at the output of the transducer under certain conditions of operation. The illustrated signal waveform includes pulses 49, 50 and 51 applied from the pulser 36, pulses 52, 53 and 54, produced by reflections from the front or top surface of the part 11 and pulses 55, 56 and 57 produced by reflections from the back or bottom surface of the part 11. A pulse 58 is illustrated, produced by a reflection from a flaw within the part 11, in response to the first transmitted pulse 49. A pair of pulses 59 and 60 are shown, produced by reflections of flaws from the second transmitted pulse 50. In order to illustrate and explain the operation of reset circuitry, no pulses are shown generated by flaws following the third transmitted pulse 51.

Reference numeral 62 indicates the waveform of the signal produced at the output of the tracking gate circuit 40. This signal contains pulses of rectangular waveform, having leading edges at times delayed by fixed time delays after the front surface pulses 52, 53 and 54 and having trailing edges at times ahead of the pulses 55, 56 and 57 from the back surface.

Reference numeral 63 indicates the waveform of the gated sonic signals produced at the output of the gate 41, This signal contains the pulses 58, 59 and 60 from flaws and also contains lower amplitude hash or noise components.

Referring now to FIG. 2, the gated sonic signal produced at the output of the gate circuit 41 is applied through a line 65 to a clipper circuit 66 which operates to remove lower amplitude noise components and to develop a clean signal having a stable base line, the waveform of the gated and clipped sonic signal being indicated by reference numeral 67 in FIG. 3. The clipping of the signal is important in obtaining clear indications and also in insuring reliable operation of reset circuitry as hereinafter described. The clipper circuit 66 contains adjustment means for adjusting the level of the clipping operation, as described hereinafter in connection with FIG. 6 which shows the circuit diagram of the clipper circuit 66.

The gated and clipped signal from the clipper circuit 66 is applied to a tone range amplifier 68 which amplifies the gated sonic pulses. Adjustment means are provided in the amplifier circuit 68 for adjusting the degree of amplification and to thereby control the shading of the recording produced on the paper 28, as is clarified hereinbelow.

The output of the tone range amplifier 68 is applied to a multi-level discriminator circuit 70 which forms a very important feature of the invention. The discriminator circuit 70 produces an output signal at one of ten progressively different discrete output levels respectively corresponding to contiguous amplitude ranges of the peaks of the sonic pulses, and to thus digitize the gated sonic pulses into ten discrete levels. The digitized signal produced at the output of the discriminator circuit 70 is applied to a selector switch 71 to be applied either directly to an input of a high voltage pen amplifier 72 or to be applied to the input of an inverting amplifier 73 having its output connected directly to the input of the high voltage pen amplifier 72. When the output of the circuit 70 is applied directly to the input of the amplifier 72, a positive recording is obtained with the intensity of the recording in a black direction being proportional to the amplitude of the output signal from the discriminator 70. When the signal is applied through the inverting amplifier 73, a black indication is produced on the recording paper 28 when there is no output signal from the discriminator circuit 70, and the output signals from the circuit 70 produce indications which are either in varying shades of gray or white, depending upon the amplitude. Either a positive or a negative indication may thus be obtained, depending upon the type of part being inspected, and the sonic technique being used.

The output of the high voltage pen amplifier circuit 72 is applied through the line 43 to the pen unit 27 and the output is at one of a plurality of discrete DC levels corresponding to the levels of the output of the discriminator circuit 70. By way of example, the output of the amplifier circuit 72 may run from 50 to 250 volts in ten 20 volt steps. Preferably, an intensity control is provided in the circuit 72 to compensate for writing speed and pen point diameter changes.

The pen voltage may be at a maximum when the pen unit 27 reaches the limit of its travel in either direction and when the carriage 17 and paper 28 are indexed. At such times, the pen unit is substantially stationary relative to the paper and it is found that with the high voltage applied, a hole may be burned in the paper. A hole may also be burned in the paper when the operator manually stops operation, as by depressing a stop button which controls the motor control unit 24. In accordance with this invention, a motor control synchronization circuit 74 is provided which is coupled through a line 75 to the pen amplifier and intensity control circuit 72 and which is coupled through lines 76 and 77 to the motor control unit 24. The motor control unit 24 supplies certain voltages to the lines 76 and 77 when the operator manually stops operation or when the carriage 17 is being indexed and at such time, a signal is applied through line 75 to shut off the pen voltage. A switch is incorporated in the circuit 74 to permit normal operation of the pen in the absence of a motor control synchronization connection.

In accordance with another important feature of the invention, an edge-sensing control circuit 78 is provided which is coupled through a line 79 to the high voltage pen amplifier and intensity control circuit 72 and which receives a signal from the tracking gate circuit 40, through a line 80. In the absence of a tracking gate, which occurs when the probe 13 has passed over the edge of a part, a signal is applied through the line 79 to cause the output of the pen amplifier circuit 72 to go to a maximum. With this feature, a darkened recording is obtained which outlines the edge of a part being inspected.

A further important feature of the invention is in the provision of means for resetting the discriminator circuit 70 in response to an initial portion of a sonic pulse in the gated sonic signal. In accordance with this feature, the output of the clipper circuit 66 is applied to a strobe reset pulse generator 82 which responds to the initial portion of a pulse applied thereto to generate a reset pulse which is applied through a NOR gate circuit 83 to the discriminator circuit 70. By way of example, a signal having an amplitude which is 5% of the normal maximum pulse amplitude may be sufficient to generate the strobe reset pulse, to reset the discriminator circuit 70. Accordingly, if the applied pulse is of an amplitude differing from the preceding pulse, the discriminator circuit 70 is set at a new level.

In accordance with another feature of the invention, an auxiliary reset pulse is generated and applied to the discriminator circuit 70 when no sonic pulse is applied to the discriminator circuit during any gating time interval of the gated sonic signal. In particular, the tracking gate signal which is applied through the line 80 to the edge-sensing control circuit 78 is inverted within the circuit 78 and is applied through a line 85 to a flip-flop circuit 86 and also to a NAN gate circuit 87 having a second input connected to the flip-flop 86 and having an output connected to the NOR gate circuit 83. A second input of the flip-flop circuit 86 is connected to the output of the strobe reset pulse generator 82.

The trailing edge of the tracking gate signal is differentiated and is applied to the flip-flop circuit 86 to place the flip-flop circuit 86 in a set condition. During the next gated sonic signal, if a sonic pulse is developed from which a strobe reset pulse is generated, the reset pulse is applied to the flip-flop circuit 86 to reset the flip-flop circuit 86. The NAN gate circuit 87 is then closed, and a pulse generated at the trailing edge of the tracking gate cannot be applied through the gates 87 and 83 to the discriminator. However, if no sonic pulse is applied during a gating time interval, the flip-flop circuit 86 remains in a set condition and the NAN gate 87 is open so that a pulse generated at the trailing edge of the tracking gate is applied through the gate circuits 87 and 83 to the discriminator circuit 70, so as to reset the circuit.

Discriminator circuit 70 produces an output as indicated by reference numeral 88 in FIG. 3. During initial portions of the sonic pulse 59 it moves toward a reset condition and at the peak of each pulse it is set at a proportionate level to remain until reset. It is noted that the output does not go to zero because the sonic pulse outlasts the reset pulse in time, as will hereinafter be clarified, and during the higher level pulse 60 the output moves directly to a higher level, again without going to zero. This feature is very important, particularly in that it prevents the occurrence of black dots during negative recording. At the trailing edge of the third illustrated tracking gate signal, in which no sonic pulse was developed, it is reset by an auxiliary reset pulse applied through gate circuits 87 and 83.

Figure 5:
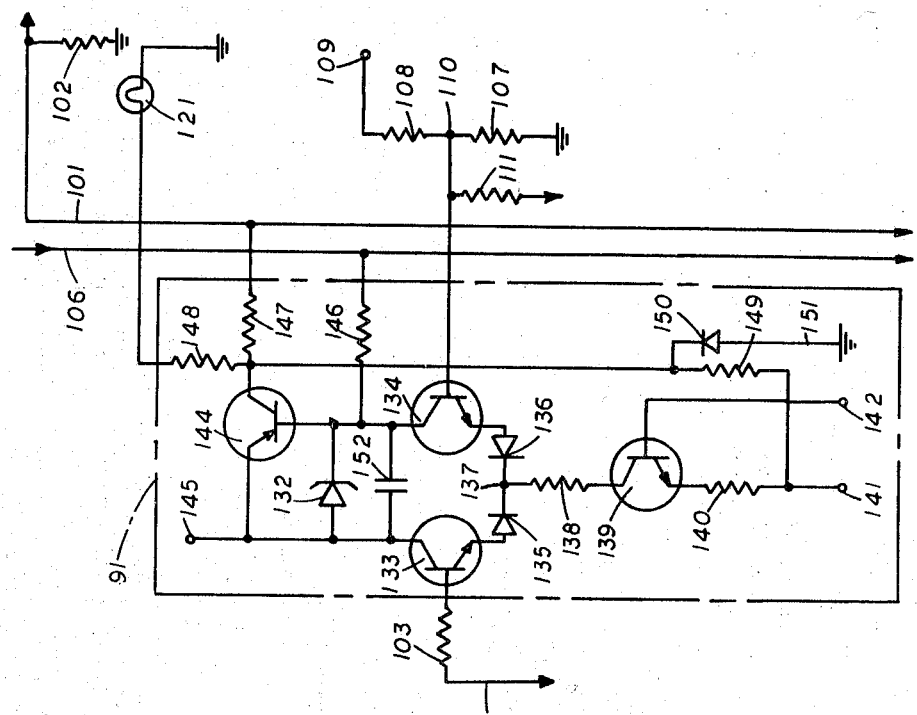
FIG. 5 is a circuit diagram of a bistable or flip-flop circuit, ten of which are used in the discriminator circuit of FIG. 4.
Figure 4:
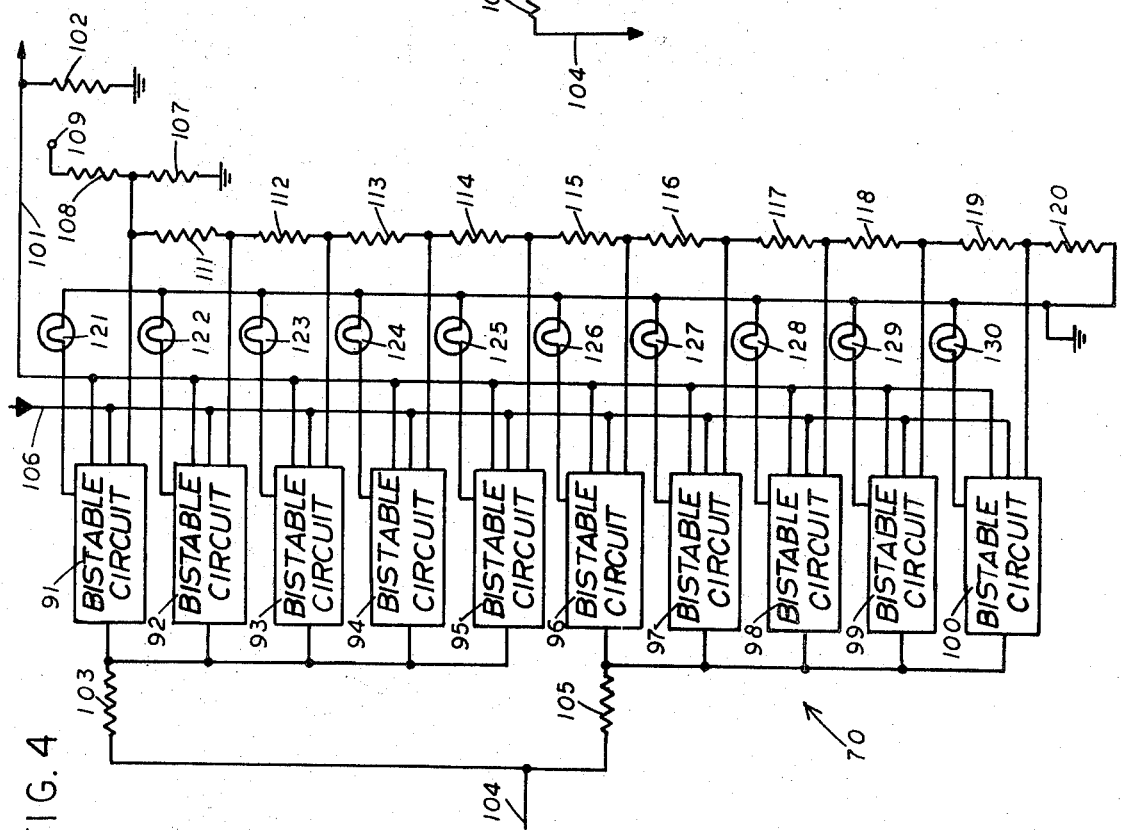
FIG. 4 is a block diagram of a multi-level discriminator circuit.

Referring now to FIGS. 4 and 5, the discriminator circuit 70 comprises ten bistable circuits 91–100 having outputs connected to a line 101 which is connected through a resistor 102 to ground and also to the selector switch 71 to be connected directly to the input of the high voltage pen amplifier and intensity control circuit 72, or indirectly therethrough to the inverting amplifier 73. Inputs of the bistable circuits 91–95 are connected together and through a resistor 103 to a line 104, while inputs of the bistable circuits 96–100 are connected together and through a resistor 105 to the line 104. Line 104 is connected to the output of the tone range amplifier circuit 68. Reset inputs of the bistable circuits 91–100 are connected together and to a line 106 to which reset pulses are applied from the NOR gate circuit 83.

To control the levels at which the bistable circuits 91–100 are operative, a ladder circuit is provided which comprises a pair of resistors 107 and 108 connected in series between ground and a power supply terminal 109 to which a regulated positive supply voltage is applied. The junction between resistors 107 and 108 is connected through ten resistors 111–120 to ground. Preferably, the resistors 111–120 have equal resistances and by way of example, the resistance of each resistor may be 100 ohms with the values of resistors 107 and 108 and the value of the supply voltage such that a voltage drop of 0.8 volt is produced across each of the resistors 111–120. The circuit points at the upper ends of the resistors 111–120 are respectively connected to inputs of the bistable circuits 91–100.

Each of the bistable circuits 91–100 is arranged to be triggered from a reset condition to a set condition when the amplitude of a signal which is applied to the input coupled through resistor 103 or resistor 105 to the line 104 exceeds a certain value in relation to the signal applied to the input thereof which is connected to the latter circuit formed by resistors 111–120. The input sonic pulses applied on line 104 are of negative polarity and when the input pulse is of a certain relatively low amplitude, only the bistable circuit 100 is triggered to its set condition. When the input pulse is of somewhat greater amplitude, both the circuits 100 and 99 are triggered and when the input pulse is of still greater amplitude, the circuits 100–98 are triggered, and so on. Thus a number of circuits are triggered, according to the amplitude of the input pulse.

When the bistable circuits 91–100 are respectively triggered to their set conditions, switch devices therein are effectively closed to connect a power supply terminal through resistors having relatively high values to the output line 101 which is connected through the resistor 102 to ground, the resistor 102 having a relatively low value. Thus a summing circuit is obtained, with the current through the resistor 102 and the voltage drop thereacross being proportional to the number of bistable circuits which are triggered to the respective set conditions thereof.

To indicate the operation of the bistable circuits, output terminals thereof may be connected through indicator lamps 121–130 to ground.

The circuit of the bistable circuit 91 is shown in FIG. 5, the circuits of the other bistable circuits 92–100 being identical thereto. As shown, the circuit 91 comprises a tunnel diode 132 which is connected between the collector electrodes of a pair of transistors 133 and 134 operated as a differential amplifier with the base electrode of the transistor 133 being coupled through the resistor 103 to the input line 104 and with the base electrode of the transistor 134 being connected to the upper terminal of the resistor 111 of the voltage-divider ladder circuit. The emitters of the transistors 133 and 134 are connected through diodes 135 and 136 to a circuit point 137 which is connected through a resistor 138 to the collector of a transistor 139 having its emitter connected to a resistor 140 to a power supply terminal 141 to which a negative supply voltage is applied. The base of the transistor 139 is connected to a power supply terminal 142 to which a voltage is applied which is negative with respect to ground, but positive with respect to the voltage of the terminal 141. By way of example, minus 25 volts may be applied to the terminal 141 while minus 18 volts is applied to the terminal 142. With this arrangement, the transistor 139 operates as a current-regulating device.

The collector of the transistor 133 together with one terminal of the tunnel diode 132 are connected to the emitter of a switching transistor 144 and also to a power supply terminal 145 to which a positive power supply voltage is applied, such as plus 12 volts, for example. The collector of the transistor 134 together with a terminal of the tunnel diode 132 are connected to the base electrode of the switching transistor 144 and also through a resistor 146 to the reset line 106.

The collector of the switching transistor 144 is connected through a resistor 147 to the output line 101 and through a resistor 148 to the indicating lamp 121, through a resistor 149 to the power supply terminal 141 and through a diode 150 to a line 151 which may be connected to ground. A capacitor 152 is preferably connected in parallel with the tunnel diode 132.

In the operation of the circuit 91, the switching transistor 144 is normally non-conductive or "off," the transistor 133 is normally "on" and the transistor 134 is normally "off." When the amplitude of the negative input pulse applied to the base of the transistor 133 exceeds a certain value in relation to the reference voltage applied from circuit point 110 to the base of the transistor 134, the tunnel diode 132 is triggered to cause conduction of the switching transistor 144. The tunnel diode 132 holds the transistor 144 in a conductive state until a reset pulse is applied from line 106 through resistor 146 to the base of the switching transistor 144. With the switching transistor 144 conductive, the collector thereof is connected through a relatively low impedance to the power supply terminal 145, to energize the indicating lamp 121 and to develop a certain current flow through the resistor 147, which is reflected in a voltage rise at the output line 101.

It is important to note that with the use of the tunnel diode 132, a fast and accurate switching operation is obtained, which is highly advantageous.

Figure 6:
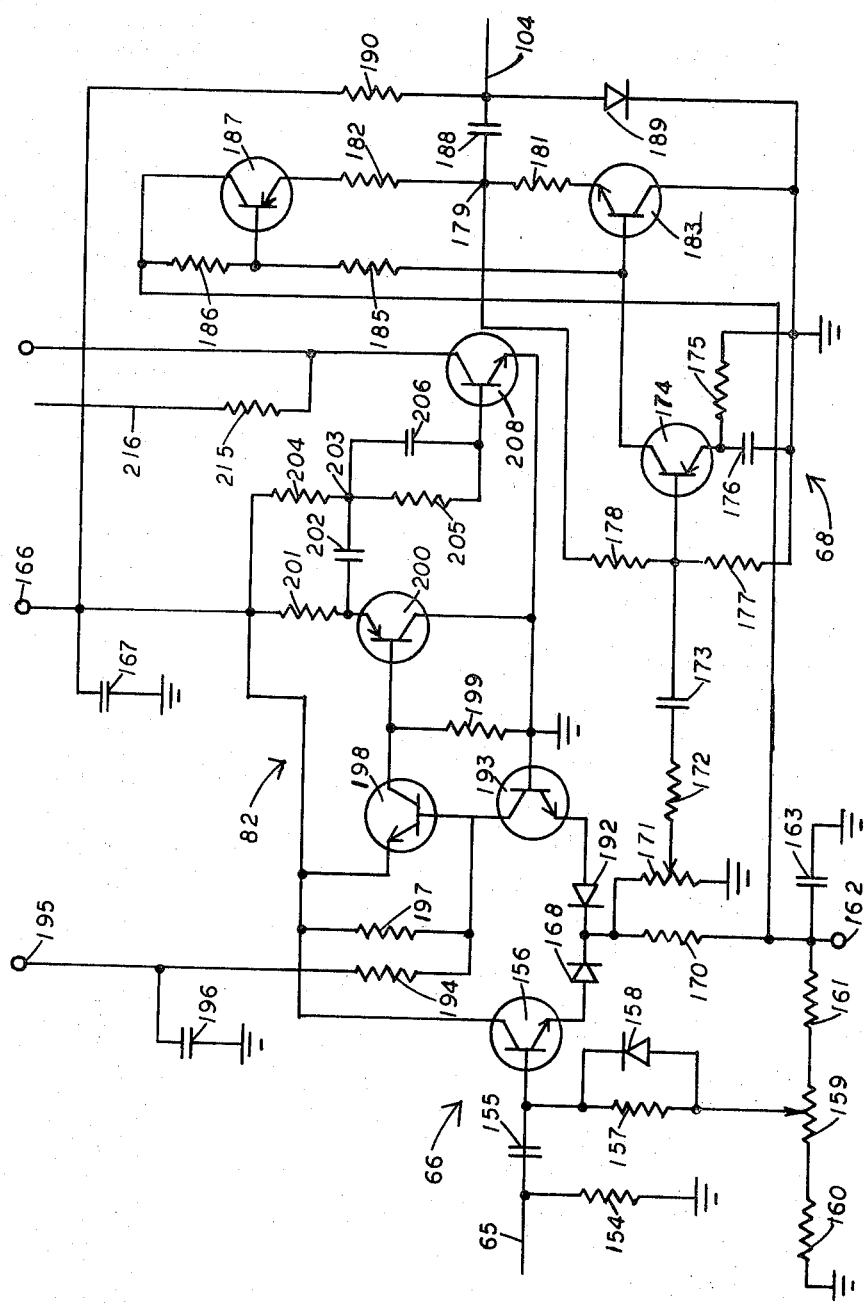
FIG. 6 is a circuit diagram of clipper, tone range amplifier and reset pulse generator circuits.

FIG. 6 shows the circuits of the clipper 66, the tone range amplifier 68 and the strobe reset pulse generator 82. Referring thereto, the input line 65 on which the gated sonic signal is applied is connected through a resistor 154 to ground and through a coupling capacitor 155 to the base of a transistor 156, which is connected through the parallel combination of a resistor 157 and a diode 158 to the movable contact of a potentiometer 159 having one end terminal connected through a resistor 160 to ground and having an opposite end terminal connected through a resistor 161 to a power supply terminal 162 to which a negative supply voltage is applied, such as minus 24 volts for example. A capacitor 163 may preferably be connected between terminal 162 and ground.

The diode 158 and associated circuit elements operate as a clipper to remove lower amplitude portions of the gated video signal, the level of the clipping operation being adjusted by adjustment of the potentiometer 159.

The transistor 156 is operated as an emitter-follower, the collector thereof being connected to a power supply terminal 166 which may be operated at plus 12 volts, for example, and which may be connected through a capacitor 167 to ground. The emitter of the transistor 156 is connected through a diode 168 to a circuit point 169 which is connected through a resistor 170 to the power supply terminal 162 and also through a potentiometer 171 to ground. The movable contact of the potentiometer 171 is connected through a resistor 172 and a capacitor 173 to the base of a transistor 174 in the tone range amplifier 68. Potentiometer 171 is adjustable to adjust the level of amplification to adjust the signal variation required to produce a given contrast in the recording. By adjustment of the potentiometer 171, a 10% change in signal amplitude can cause the recorder to write from light to full dark and by reducing the tone range variations in signal amplitude, anywhere from 10% to 100% can be made to match the recording range of the recording paper. It is also possible to adjust the potentiometer 171 in conjunction with the intensity control adjustment in the circuit 72, to obtain black and white recording with exaggerated contrast, or to produce other effects, depending upon the type of inspection operation which is being performed.

The emitter of the transistor 174 is connected through a resistor 175 and a capacitor 176 to ground while the base thereof is connected through a resistor 177 to ground and through a resistor 178 to a circuit point 179. Circuit point 179 is connected through resistors 181 and 182 to the emitters of a pair of transistors 183 and 184 having collectors connected respectively to ground and to the negative power supply terminal 162. The base of the transistor 183 is connected to the collector of the transistor 174 and through a resistor 185 to the base of the transistor 184 which is connected through a resistor 186 to the power supply terminal 162.

With this circuit, an amplified pulse of negative polarity is developed at the circuit point 179 with a high degree of stability. This signal is applied through a coupling capacitor 188 to the line 104 to be applied to the inputs of the bistable circuits of the discriminator circuit 70. Line 104 is connected through a diode 189 to ground and through a resistor 190 to the power supply terminal 166, to prevent the potential of the line 104 from rising substantially above ground potential and to maintain in effect a stable base line.

The signal developed at the circuit point 69, at the output of the clipper circuit 66, is applied through a diode 192 to the emitter of a transistor 193 having a grounded base. The collector of the transistor 193 is connected through a resistor 194 to a power supply terminal 195 to which plus 24 volts may be applied, for example. A capacitor 196 may be connected between terminal 195 and ground. The collector of transistor 193 is connected also through a resistor 197 to the power supply terminal 166 and to the base of a transistor 198 having a collector connected through a resistor 199 to ground and also connected to the base of a transistor 200. The collector of transistor 200 is connected to ground while the emitter thereof is connected through a resistor 201 to the power supply terminal 166 and also through a capacitor 202 to a circuit point 203 which is connected through a resistor 204 to the power supply terminal 166 and through the parallel combination of a resistor 205 and a capacitor 206 to the base of the transistor 208.

In the operation of the strobe reset pulse generator circuit 82 as thus far described, the transistors 193, 198 and 200 function to provide a very high degree of amplification but with saturation at a certain amplitude level, to generate a squarewave signal having a very fast rising leading edge portion corresponding to the initial portion of an applied pulse. For example, a pulse having an amplitude of less than 5% of the amplitude of the maximum applied input signal may be sufficient to produce saturation of the amplifier circuit.

The form of the saturation amplifier output signal produced at the emitter of the transistor 200 is indicated by reference numeral 210 in FIG. 3, wherein reference numerals 211, 212 and 213 respectively indicate the squarewave pulses produced from the pulses 58, 59 and 60, respectively.

The capacitor 202 together with the resistor 204 operate as a differentiating circuit to develop negative pulses in response to the leading edges of the squarewave pulses. Such negative pulses are applied to the base of the transistor 208, the emitter of which is grounded and the collector of which is connected through the resistor 215 to a line 216 which is connected to an input of the NOR gate circuit 83. In response to such negative pulses applied to the base of transistor 208, positive pulses are developed at the collector thereof and also at the output line 216 to be also developed at the line 106 and applied to the bistable circuits 91–100, as hereinafter described. The form of signal developed at line 106 is indicated in FIG. 3 by reference numeral 218, wherein reference numerals 219, 220 and 221 indicate the form of pulses developed in response to the leading edges of the pulses 211, 212 and 213. It may be noted that the differentiating circuit formed by capacitor 202 and resistor 204 also develops positive pulses from the trailing edges of the squarewave pulses, but such positive pulses are effectively eliminated and are not used in the circuit.

Figure 7:
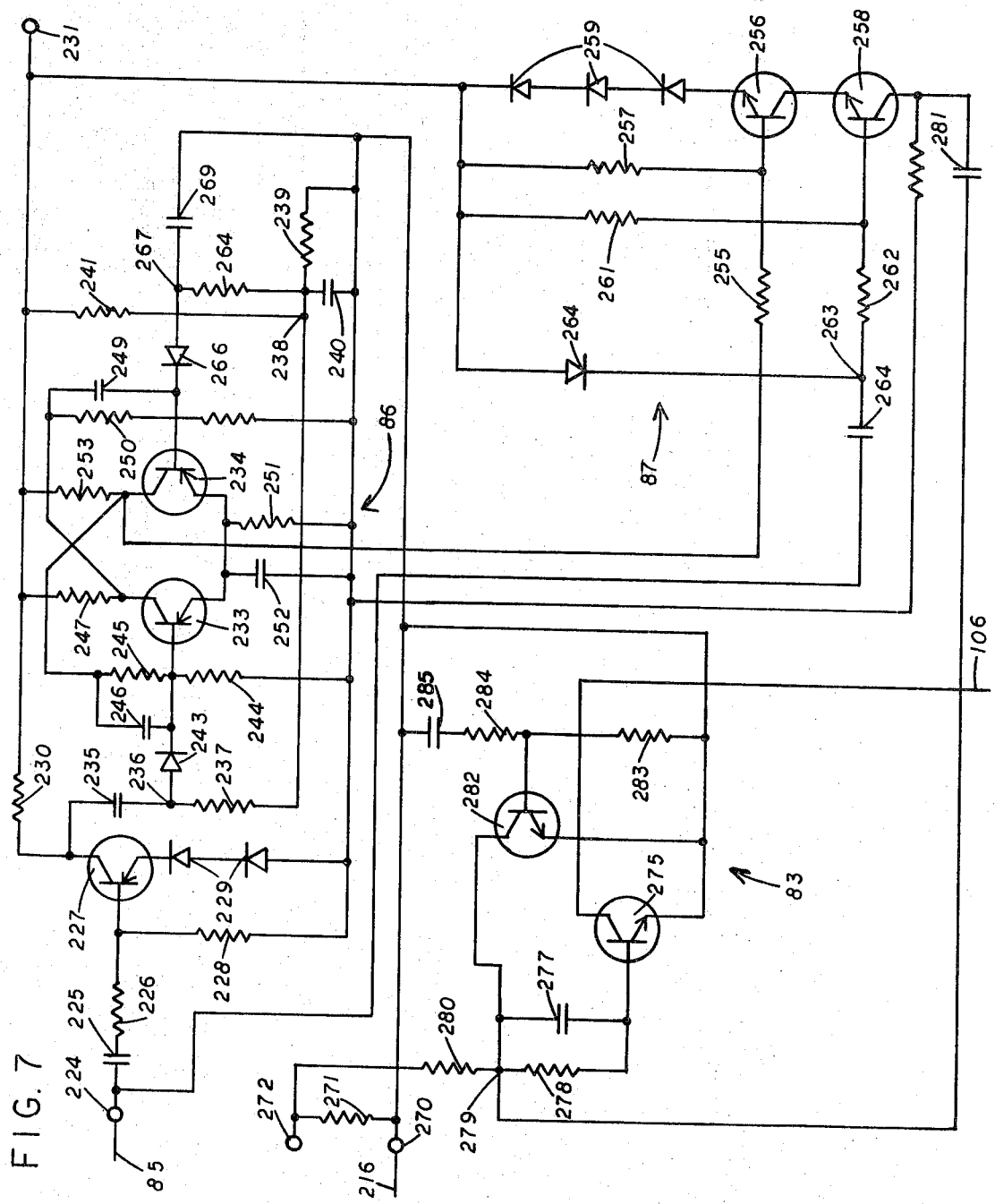
FIG. 7 is a circuit diagram of flip-flop and gate circuits used for generating auxiliary reset pulses.

Referring now to FIG. 7, a tracking gate signal is applied through line 85 to an input terminal 224 which is connected through a capacitor 225 and a resistor 226 to the base of a transistor 227 which is connected through a resistor 228 to ground. The emitter of transistor 227 is connected through a pair of diodes 229 to ground while the collector thereof is connected through a resistor 230 to a power supply terminal 231 which may supply minus 12 volts, for example. The transistor 227 operates to invert the negative tracking gate signal, to produce a positive gate signal at its collector. The signal so developed is applied to a differentiating circuit to develop positive pulses in response to the leading edges of the tracking gate signal which are used to trigger a flip-flop circuit containing a pair of transistors 233 and 234.

In particular, the collector of the transistor 227 is connected through a capacitor 235 to a circuit point 236 which is connected through a resistor 237 to a circuit point 238 which is connected through a resistor 239 and a capacitor 240 in parallel to ground and which is connected through a resistor 241 to the power supply terminal 231. The resistor 237 and the capacitor 235 operate as a differentiating circuit to develop a positive pulse at the circuit point 236 in response to the leading edges of the tracking gate signals. The circuit point 236 is connected through a diode 243 to the base of the transistor 233 which is connected through a resistor 244 to ground and through the parallel combination of a resistor 245 and a capacitor 246 to the collector of the transistor 234. The collector of the transistor 233 is connected through a resistor 247 to the power supply terminal 231 and is also connected through the parallel combination of a capacitor 249 and a resistor 250 to the base of the transistor 234. The emitters of the transistors 233 and 234 are connected together and through a resistor 251 and a capacitor 252 to ground.

The collector of the transistor 234 is connected through a resistor 253 to the power supply terminal 231 and also forms an output terminal for the flip-flop circuit, which is connected through a resistor 255 to the base of a transistor 256, the base of transistor 256 being also connected through a resistor 257 to the power supply terminal 231.

Transistor 256 and another transistor 258 are connected in series and form the NAN gate circuit 87. In particular, the emitter of transistor 256 is connected through three diodes 259 in series to the power supply terminal 231 and the collector of transistor 256 is connected to the emitter of the transistor 258 the collector of which is connected through a resistor 260 to ground. The base of the transistor 258 is connected through a resistor 261 to the power supply terminal 231 and is also connected through a resistor 262 to a circuit point 263 which is connected through a diode 264 to the power supply terminal 231 and which is connected through a capacitor 264 to the input terminal 224 to which the negative tracking gate signal is applied from line 85.

In operation, the resistors 261 and 262 together with the capacitor 264 operate as a differentiating circuit to develop a positive pulse at the base of the transistor 258 in response to the trailing edge of the negative tracking gate signal. If transistor 256 is conductive, a negative pulse is then developed at the collector of the transistor 258, but no signal is developed if the transistor 258 is non-conductive.

The conduction of the transistor 256 is controlled from the flip-flop circuit formed by transistors 233 and 234 which is placed in a reset condition in response to a positive pulse applied from circuit point 236 in response to the leading edge of the tracking gate signal. The flip-flop circuit may be placed in a set condition in response to the generation of a strobe reset pulse. If the flip-flop circuit is placed in a set condition, a signal is applied to the transistor 256 to prevent conduction thereof, and to prevent generation of a pulse at the collector of the transistor 258 in response to the trailing edge of the tracking gate. If, however, the flip-flop circuit is in a reset condition, the transistor 256 is rendered conductive and the transistor 258 functions to develop a negative pulse at the collector thereof in response to the trailing edge of the tracking gate.

To place the flip-flop circuit in a set condition in response to the strobe reset pulse, the base of the transistor 234 is connected through a diode 266 to a circuit point 267 which is connected through a resistor 268 to the circuit 238 and which is connected through a capacitor 269 to a terminal 270, connected to the strobe reset pulse line 216. Terminal 270 may also be connected through a resistor 271 to a power supply terminal 272, to which a power supply voltage of plus 12 volts may be applied, for example.

In operation, transistor 233 is rendered conductive following the leading edge of the tracking gate while transistor 234 is non-conductive. A positive pulse applied from line 216 to terminal 270 is applied through capacitor 269 and diode 266 to the base of the transistor 234 to initiate conduction of the transistor 234 and to turn the transistor 233 off.

The NOR gate circuit 83 is formed by a transistor 275 which has its emitter connected to ground and which has its collector connected to the line 106, connected to the flip-flops of the discriminator circuit 70. The base of the transistor 275 is connected through the parallel combination of a capacitor 277 and a resistor 278 to a circuit point 279 which is connected through a resistor 280 to the power supply terminal 272 and which is connected through a capacitor 281 to the collector of the transistor 258. Circuit point 279 is also connected to the collector of a transistor 282 the emitter of which is connected to ground and the collector of which is connected through a resistor 283 to ground and through a resistor 284 and a capacitor 285 to the strobe reset pulse input terminal 270.

In operation, the transistor 282 inverts the positive strobe reset pulse applied from line 216 and applies a negative pulse to the base of the transistor 275 which develops a positive pulse on the line 106. A negative pulse applied from the collector of the transistor 258 of the NAN gate circuit is also applied to the base of the transistor 275 to develop a positive reset pulse on the line 106.

Figure 8:
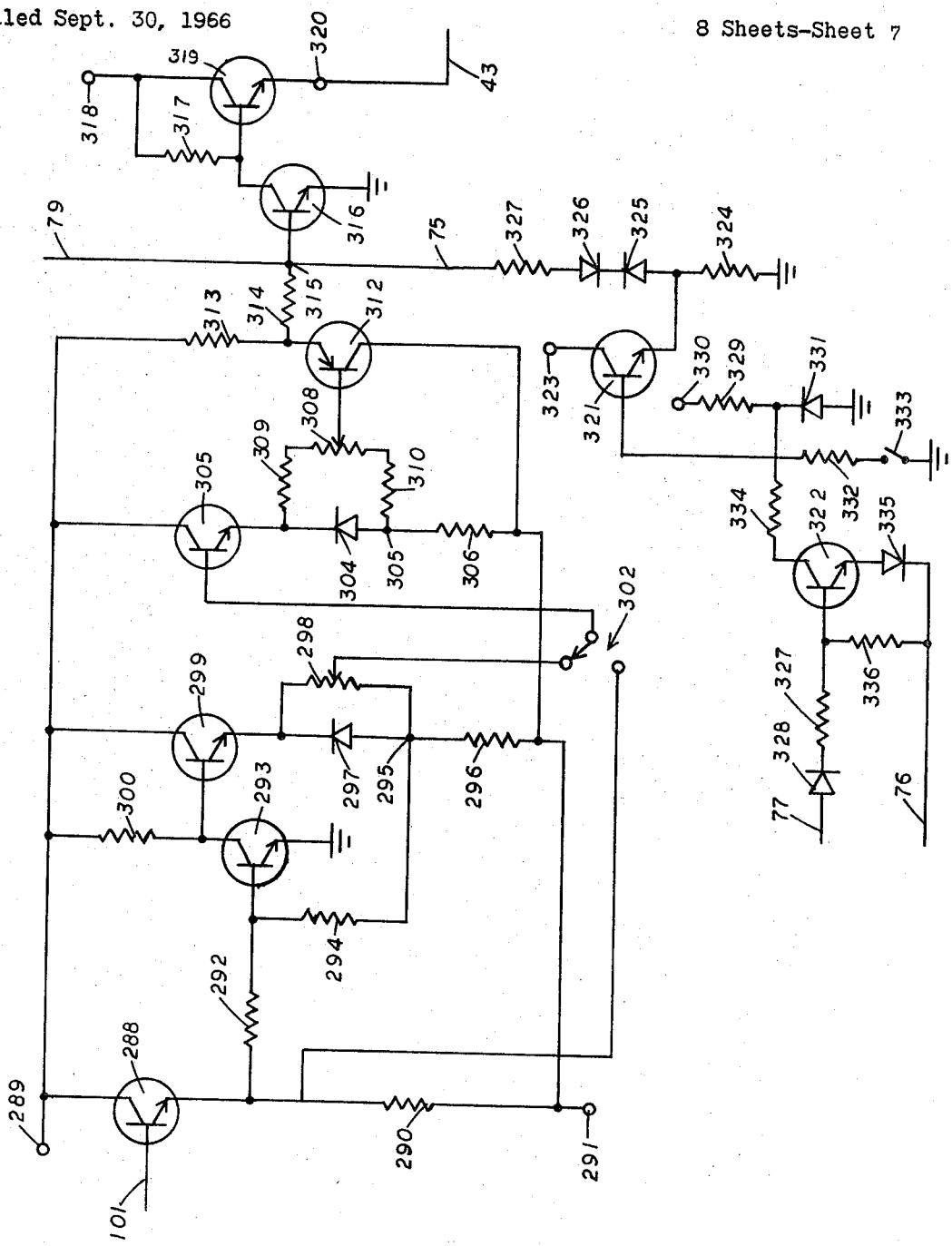
FIG. 8 is a circuit diagram of amplifier and control circuitry used for applying voltages to the pen of the recording system.

Referring now to FIG. 8, the output of the multi-level discriminator circuit 70 is applied through line 101 to the base of a transistor 288 operated as an emitter-follower, the collector thereof being connected to a power supply terminal 289 and the emitter thereof being connected through a load resistor 290 to a power supply terminal 291. By way of example, power supply voltages of plus 24 volts and minus 24 volts may be applied respectively to the terminals 289 and 291.

The emitter of the transistor 288 is connected through a resistor 292 to the base of a transistor 293 which is connected through a resistor 294 to a circuit point 295. Circuit point 295 is connected through a resistor 296 to the power supply terminal 291 and through a Zener voltage regulating diode 297 and a potentiometer 298 in parallel to the emitter of a transistor 299 the collector of which is connected to power supply terminal 289. The base of transistor 299 is connected to the collector of the transistor 293 and to the power supply terminal 289 through a resistor 300.

In operation, transistor 293 operates as an inverting amplifier and transistor 299 operates as an emitter-follower, with a voltage being developed at the movable contact of potentiometer 298 of varying levels.

With the Zener diode 297, the voltage variations of the contact of the potentiometer 298 correspond to those at the emitter of the transistor 299, but the level thereof is shifted according to the adjustment of the movable contact, so that the potentiometer 298 serves as a level or balance adjustment device.

The contact of the potentiometer 298 is connected to a fixed contact of a switch 302 which forms the functional equivalent of the switch 71, shown in the block diagram of FIG. 2, a second fixed contact of the switch 302 being connected to the emitter of the input emitter-follower transistor 288. The movable contact of switch 302 is connected to the base of a transistor 303 which is operated as an emitter-follower and which has its collector connected to the power supply terminal 289 with the emitter thereof being connected through a Zener diode 304 to a circuit point 305 which is connected through a resistor 306 to the power supply terminal 291. An intensity control potentiometer 308 has end terminals connected through resistors 309 and 310 to the emitter of transistor 303 and the circuit point 305, with a movable contact of potentiometer 308 being connected to the base of a transistor 312. The collector of the transistor 312 is connected to the power supply terminal 291 while the emitter thereof is connected through a resistor 313 to the power supply terminal 289. The emitter of transistor 312 is additionally connected through a resistor 314 to a circuit point 315 which is connected to the base of a transistor 316 having a grounded emitter. The collector of transistor 316 is connected through a resistor 317 to a high voltage terminal 318 and is also connected to the base of a transistor 319, the collector of the transistor 319 being connected to the terminal 318, and the emitter of the transistor 319 being connected to a terminal 320 which is connected through the line 43 to the pen unit A relatively high voltage is applied to the terminal 318 which may be on the order of 250 volts DC, for example.

The motor control synchronization circuit 74 comprises a pair of transistors 321 and 322. The transistor 321 has a collector connected to a power supply terminal 323 to which plus 24 volts may be applied, for example. The emitter of transistor 321 is connected through a resistor 324 to ground and is also connected through a diode 325, a Zener diode 326 and a resistor 327 in series to the line 75 which is connected to the circuit point 315. The base of transistor 321 is connected through a resistor 329 to a power supply terminal 330 to which plus 12 volts may be applied, through a diode 331 to ground, through a resistor 332 and an on-off switch 333 to ground, and through a resistor 334 to the collector of the transistor 322. The emitter of the transistor 322 is connected through a diode 335 to the line 76 while the base thereof is connected through a resistor 336 to the line 76 and through a resistor 337 and a diode 338 in series to the line 77.

In operation, a negative voltage, minus 12 volts for example, is applied to the line 76 when the motor control unit is on. When the DC motor of the drive unit 32 is energized, the negative voltage, minus 3 volts for example, is supplied through diode 338 and resistor 337 to the base of the transistor 322 to render the transistor 322 conductive. When transistor 322 is conductive, the potential of the base of the transistor 321 is reduced to a level at or slightly below ground potential, to render the transistor 321 non-conductive. The emitter of the transistor 321 is then decoupled from the line 75 and the circuit point 315, through the Zener diode 326, and the circuit is decoupled from the pen driving circuit.

During the indexing cycle, when the pen unit is substantially stationary relative to the paper, a higher negative voltage is applied to the line 77, minus 9 volts, for example, to render the transistor 322 non-conductive. With transistor 322 being non-conductive, a voltage is applied to the base of transistor 321 which is substantially above ground potential and through the Zener diode 326 a high positive voltage is applied to the base of the transistor 316 to render the transistor 319 non-conductive and to remove voltage from the pen unit.

The same operation results from the removal of the minus 12 volt signal from the line 76.

Referring to FIG. 9, the tracking gate signal from the tracking gate circuit 40 is applied to an input terminal 340 which is connected through a capacitor 341 and a resistor 342 to the base of a transistor 343 which is connected through a resistor 344 to a power supply terminal 345, to which minus 12 volts may be applied, for example. The transistor 343 operates as an amplifier and as an inverter, the emitter thereof being connected to the terminal 345 and the collector thereof being connected through a load resistor 346 to ground. The inverted tracking gate signal thus developed at the collector of the transistor 343 is applied to the line 85 to be applied to the reset circuitry and is also applied to a flip-flop circuit generally designated by reference numeral 347 and to a timing circuit generally designated by reference numeral 348. In the general operation of the circuit, the leading edge of the tracking gate switches the flip-flop 347 to one condition and at the same time, the tracking gate holds the timing circuit 348 in an inoperative condition. However, with no tracking gate signal applied, the timing circuit 348 functions to develop a signal which triggers the flip-flop circuit 347 to an opposite condition. A signal is then developed which is applied through amplifier circuitry to the pen driver, causing the pen to write black.

The flip-flop circuit 347 comprises a pair of transistors 349 and 350 having emitters connected together and connected to ground through a capacitor 351 and a resistor 352 in parallel. The collectors of the transistors 349 and 350 are connected through resistors 353 and 354 to a power supply terminal 355 to which plus 12 volts may be applied, for example. A resistor 357 and a capacitor 358 are connected in parallel between the collector of the transistor 349 and the base of the transistor 350, while a resistor 359 and a capacitor 360 are connected in parallel between the collector of the transistor 350 and the base of the transistor 349.

To trigger the flip-flop 347 to one condition at the leading edge of the tracking gate signal, the base of the transistor 349 is connected through a diode 361 to a circuit point 362 which is connected through a resistor 363 to ground and through a capacitor 364 to the collector of the transistor 343, at which the inverted tracking gate signal is developed, as above described. The resistor 363 and the capacitor 364 operate as a differentiating circuit to develop a negative pulse at the leading edge of the tracking gate signal which is applied through the diode 361 to trigger the transistor 349 out of conduction and to thereby cause conduction of the transistor 350.

To trigger the flip-flop 347 to the opposite stage when a signal is developed by the timing circuit 348, the base of the transistor 350 is connected through a diode 366 to a circuit point 367 which is connected through a resistor 368 to ground and through a capacitor 369 to the collector of a transistor 370 which has its emitter connected to the power supply terminal 345, with the collector being connected through a load resistor 371 to ground. The base of the transistor 370 is connected through a resistor 371 to the power supply terminal 345 and is connected through a capacitor 373 to one base electrode of a uni-junction transistor 374, which is connected through a resistor 375 to the power supply terminal 345. The other base electrode of the uni-junction transistor 374 is connected through a resistor 376 to ground. The emitter of the uni-junction transistor 374 is connected through a resistor 377 to ground, through a capacitor 378 to the power supply terminal 345 and through a diode 379 and a resistor 380 to the collector of the transistor 343.

In operation, when the tracking gate signal is developed at the collector of the transistor 343, the potential of the emitter of the uni-junction transistor 374 is held at a potential such that it cannot fire. However, when no tracking gate signal is applied, the capacitor 378 is allowed to charge through the resistor 377 and when the potential reaches a certain point, the uni-junction transistor 374 fires to develop a positive pulse at the base electrode which is coupled through the capacitor 373 to the base of the transistor 370. The transistor 370 operates as an inverter to develop a negative pulse which is applied to the base of the transistor 350, thereby causing the transistor 350 to become non-conductive while the transistor 349 is rendered conductive. With the transistor 349 being rendered conductive, the collector thereof moves toward ground potential, and a negative-going signal is developed on an output line 382 which is connected to the collector of the transistor 349.

The signal developed on the output line 382 is applied through an on-off switch 383 to the base of a transistor 384 which is operated as an emitter-follower, the collector thereof being connected to the power supply terminal 355 and the emitter thereof being connected through a resistor 385 to ground. The negative-going signal developed at the emitter of transistor 384 is applied through a Zener diode 386 to the base of a transistor 387. The base of the transistor 387 is connected through a resistor 388 to a power supply terminal 389 to which the collector of the transistor is directly connected. The emitter of the transistor 387 is connected through a resistor 390 to ground and is connected through a Zener diode 391 and a resistor 392 to the line 79 which is connected to the circuit point 315 in the high voltage pen amplifier and intensity control circuit 372.

The negative-going signal applied when the timing circuit 348 triggers the flip-flop 347, in response to the absence of a tracking gate, causes the transistor 387 to conduct and to apply a negative signal to the circuit point 315 through the Zener diode 391. Circuit point 315 is connected to the base of the transistor 316 which is rendered substantially non-conductive, and the transistor 319 conducts heavily to apply a high voltage to the pen unit. Thus a black indication is obtained on the recording paper in the absence of a tracking gate, and after a complete scanning operation, the outline of the edge of the part under test is clearly shown, which facilitates interpretation and the location of the positions of inhomogeneities within the part under test.

It will be understood that modifications and variations may be effected without departing from the spirit and scope of the novel concepts of this invention.

I claim as my invention:

1. In a recording system for use with an ultrasonic pulse-echo part-scanning system operative to produce a gated ultrasonic signal corresponding to echoes from within a predetermined depth range within a part including ultrasonic pulses having amplitudes varying with variations in the internal characteristics of the part, and recording means operative to record at a point of a recording medium moved over the medium in synchronism with the scanning of the part, said recording means being operative to produce at said point a mark having a visibility corresponding to the level of an input signal then applied to said recording means, a multi-level discriminator circuit comprising a plurality of bistable switch means arranged to respond to said gated ultrasonic signal to produce an output signal at one of a limited number of progressively different discrete output levels respectively corresponding to contiguous amplitude ranges of the peaks of said ultrasonic pulses, and means for applying said output signal to said recording means to effect the recording at progressively different discrete output levels.

2. In a recording system as defined in claim 1, said plurality of bistable means each having first and second inputs and arranged to be triggered to one condition when the amplitude of a signal applied to said first input exceeds a certain value in relation to the level of a signal applied to said second input, means for applying said ultrasonic pulses to said first inputs of all of said bistable circuits, and biasing means for applying progressively different bias voltages to said second inputs of said bistable circuits.

3. In a recording system as defined in claim 2, said biasing means comprising a voltage source and a plurality of resistors connected in series to said source to form a voltage divider.

4. In a recording system as defined in claim 2, a summing circuit connected to said bistable means for responding to the number of said bistable means placed in said one condition and to develop said output signal.

5. In a recording system as defined in claim 2, each of said bistable means including a tunnel diode.

6. In a recording system as defined in claim 2, each of said bistable means including a differential amplifier having a pair of inputs forming said first and second inputs.

7. In a recording system as defined in claim 2, each of said bistable means including a tunnel diode and a pair of transistors connected as a differential amplifier and having collector electrodes coupled to said tunnel diode and base electrodes forming said first and second inputs.

8. In a recording system as defined in claim 1, said plurality of switch means arranged to be rendered conductive when the peak amplitudes of said gated ultrasonic pulses exceed progressively different levels, a voltage source having first and second terminals, a plurality of relatively high impedances respectively connected in series with said switch devices to form series circuits all connected at one end to said first terminal, and a common output impedance connected between the other ends of said series circuits and said second terminal.

9. In a recording system as defined in claim 1, means for applying said gated ultrasonic signal to said discriminator circuit including clipper means for removing lower amplitude portions of said gated ultrasonic signal.

10. In a recording system as defined in claim 9, means for adjusting the level of operation of said clipper means.

11. In a recording system as defined in claim 1, means for applying said gated ultrasonic signal to said discriminator circuit including gain adjustment means to adjust the amplitude ranges of said ultrasonic pulses which correspond to said progressively different discrete shading levels.

12. In a recording system as defined in claim 11, said means for applying said gated ultrasonic signal to said discriminator circuit further including a tone range amplifier with said gain adjustment means including a potentiometer in the input circuit of said tone range amplifier.

13. In a recording system as defined in claim 1, said multi-level discriminator circuit being arranged to shift from a reset condition to a set condition to produce and hold said output signal at any one of said limited number of progressively different discrete output levels for a substantial length of time relative to the time interval between the start of each gating time interval and the start of the next gating time interval.

14. In a recording system as defined in claim 13, reset means for resetting said multi-level discriminator circuit to said reset condition simultaneously with application of the initial portion of a gated ultrasonic pulse thereto.

15. In a recording system as defined in claim 14, said reset means including reset pulse generating means for responding to the initial portions of said gated sonic pulses for generating reset pulses, and means responsive to said reset pulses for restoring upper portions of said multi-level discriminator circuit to an initial condition.

16. In a recording system as defined in claim 15, said reset pulse generating means comprising saturation amplifier means for responding to said ultrasonic pulses to generate squarewave signals having fast-rising leading edges corresponding to initial portions of said ultrasonic pulses, and differentiating circuit means for responding to said highest-rising edges of said squarewave signals to generate said reset pulses.

17. In a recording system as defined in claim 15, auxiliary means for generating an auxiliary reset pulse when no sonic pulse is applied to said discriminator circuit during any gating time interval of said gated ultrasonic signal, and means responsive to said auxiliary reset pulses for restoring said discriminator circuit to said initial condition.

18. In a recording system as defined in claim 17, said auxiliary means comprising a flip-flop, means for supplying a gate pulse at the end of each gating time interval, means responsive to each sonic pulse for setting said flip-flop to one stable state, means responsive to each gate pulse for resetting said flip-flop to an opposite stable state, and gate means enabled in said opposite stable state of said flip-flop for applying said gate pulse to develop said auxiliary reset pulse.

19. In a recording system as defined in claim 1, means for producing a signal in response to reflections from a front surface of a part, and means responsive to the absence of said signal to apply a signal of a certain level to said recording means to effect recording of an indication of the edge of the part.

20. In an ultrasonic part inspection system including transducer means for transmitting pulses of ultrasonic energy toward a part and receiving echoes from the front surface of the part and from inhomogeneities within the part to produce echo signals, means for effecting scanning movement of said transducer means relative to the part in a plane generally transverse to the direction of transmission and reflection of the ultrasonic energy, and recording means operative to record at a point of a recording medium moved over the medium in synchronism with and in a pattern corresponding to the scanning movement of said transducer means relative to the part, said recording means being operative to produce at said point a mark having a visibility corresponding to the level of an input signal applied to said recording means, means responsive to echo signals produced from inhomogeneities within the part for applying corresponding signals to said recording means to effect the recording of indications of said recording medium, and means responsive to the absence of an echo signal produced from the front surface of the part to apply a signal of a certain level to said recording means to effect recording of an indication of the edge of the part.

References Cited

UNITED STATES PATENTS

| | | | |
|---|---|---|---|
| 3,036,151 | 5/1962 | Mitchell et al. | 73—67.9X |
| 3,128,338 | 4/1964 | Teacher et al. | 178—6.8 |
| 3,309,913 | 3/1967 | Weighart | 73—67.8 |
| 3,326,037 | 6/1967 | Stewart | 73—67.8 |

OTHER REFERENCES

The Budd Co. Ultrasonic Testing Systems catalog UT–7000, June 1964, pp. 1, 9, 10 & 16.

Hodgkinson, W. L.: Isosonography, Ultrasonics, July 1966.

Cole, H. A. G.: A quantizing halftone generator for facsimile recording, U.K.A.E.A. unclassified report, AERE–R 4878, June 1966.

Hodgkinson, W. L.: A quantized system of facsimile recording, U.K.A.E.A. unclassified report, AERE–R 4688, 1964.

RICHARD C. QUEISSER, Primary Examiner

JOHN P. BEAUCHAMP, Assistant Examiner

U.S. Cl. X.R.

178—6.6; 346—74